May 6, 1958   W. S. BOHLMAN   2,833,244
ANIMAL TOY
Filed Dec. 7, 1956

INVENTOR
Walter S. Bohlman.

United States Patent Office 2,833,244
Patented May 6, 1958

2,833,244
ANIMAL TOY
Walter S. Bohlman, Wilmington, Del.
Application December 7, 1956, Serial No. 626,920
4 Claims. (Cl. 119—29)

This invention relates to animal toys, particularly useful for the exercise of house pets. In one aspect this invention relates to an exerciser or play device for house pets comprising a self-righting member from which a lure attractive to such pets is suspended in reach of the animal so that the animal can engage the lure in play while tilting the entire device and when desired, also moving the entire device laterally.

The device of this invention has been found to serve particularly well as an exerciser for cats and kittens, particularly when employing catnip as the lure material.

It is therefore an object of this invention to provide a play device for animals. Another object is to provide a play device particularly applicable as an exerciser for household pets, particularly cats. Another object is to provide a toy for play, for household pets, and adaptable to be moved in any direction by tugging action of the animal and then to resume the upright position when released. Other aspects and objects will be apparent from the accompanying disclosure and the appended claims.

In accordance with this invention a toy for animals is provided which comprises a laterally movable self-righting element, an elongated member extending upwardly from said self-righting element, and a lure attractive to animals suspended from said elongated member, whereby an animal when striking at the lure can tip the toy and can move it laterally and said toy will resume its upright position when the animal ceases play.

The invention having been generally set forth will now be described in more detail with reference to the attached drawings in which.

Figures 1, 2, 3:
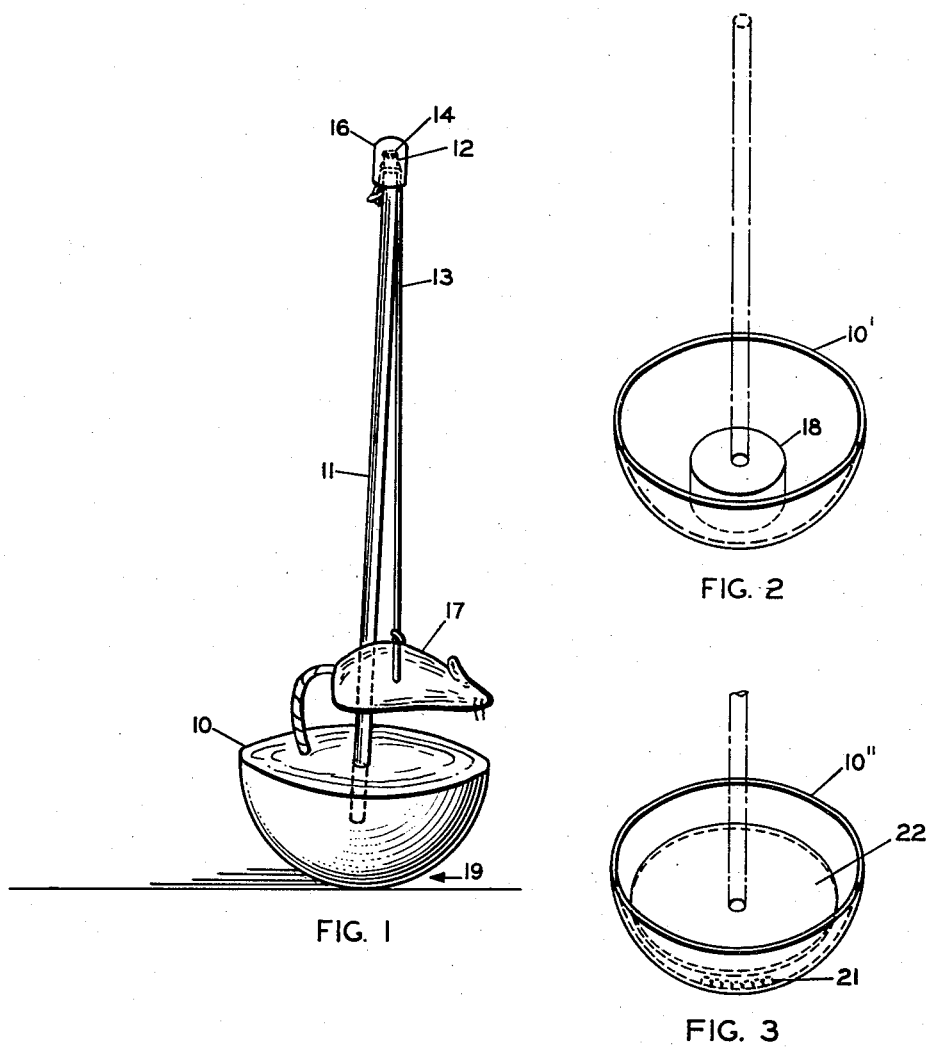
Figure 1 is a perspective view of a preferred embodiment of the invention wherein the base is a solid hemisphere-like member.
Figure 2 is a fragmentary perspective view of a modified embodiment including a dished-out base member containing a weight.
Figure 3 is a fragmentary perspective view of another modification including a dished-out base member with part of the cavity closed off by a disc with a plurality of balls in the enclosed portion of the cavity.

With reference to Figure 1, self-righting base element 10 is a portion of a sphere, generally a hemisphere and in any event of sufficient weight and dimension as to be self-righting after it has been tipped. Elongated member, or mast, 11, is affixed to the top side of member 10, preferably substantially coaxially but in any event at a point such that the base-mast assembly assumes its normal upright position after its has been tipped and released. Upper end portion 12 of mast 11 is adapted to support a string or cord 13 such as by slot 14 in end 12, or a hole (not shown) through the mast at any desired point, or by any other suitable means. String 13 is held in place when such is required, such as by a rubber ferrule 16, which can also serve as a protective member for the jointure. Lure 17 is attached to string 13 so as to be in reach of the animal, generally being attached to the end of string 13 at a point in somewhat close proximity to top of the base 10.

Lure 17 can be any suitable element so long as it is in some manner attractive to the animal. Thus lure 17 can for example be a cloth member containing a material attractive to the animal, or a bag of any suitable material destructive, or otherwise, containing catnip. For cats and kittens it is especially desirable to form the bag to simulate a mouse, as illustrated in Figure 1 of the drawings. Lure 17 can, by further example, simulate a bone for attraction of dogs or pups.

Base 10 can be fabricated from any suitable material, wood being now preferred, being heavy enough to right the mast and lure and yet, because of its light weight, facilitating easy lateral movement of the device by the animal, which results in more active play and exercise. However, light plastic, glass, metals, or the like, are other such suitable materials from which base 10 can be fabricated, it being important in some instances to place a proper ballast in the device to maintain its self-righting characteristics. The height of mast 11 is generally not more than about two to three times the diameter of the spherical member 10. In referring to base 10 as a hemisphere, a portion of a sphere, or as spherical, I do not limit myself to a truly spherical form as any similarly rounded form is suitable.

With reference to Figure 2, is illustrated a base member 10' which is a dished-out member, and contains a suitable ballast such as a metal solid 18 in a bottom-most portion.

The dimensions and weight of the ballast are such, in in any event, to cause the toy device to right itself after it has been tipped by the animal. One form of ballast, see Figure 3, can be a plurality of heavy balls 21, preferably about ¼" steel balls in a sealed-off bottom-most compartment 22 of element 10" which in addition to their function as ballast, provide addiitonal excitement and play for the animal by their rolling movement and sound during tipping of the toy.

By way of further illustration of the function of the device, a house pet, say a kitten, which is attracted by lure 17, will strike or tug at the lure which will cause the device to tip. The pet momentarily releases its hold on the lure and as a result the lure is snapped away from the pet by the self-righting action of the device. This of course excites the pet and it again strikes and tugs at the lure to repeat the exercise cycle. Further, the toy being laterally movable such as provided by the round bottom side 19 of base 10, permits the pet to move or drag the device laterally along the floor to any desired extent, while tugging at the lure, the lateral direction of motion adding to the play and providing further desired exercise.

Various modifications can be made or followed in light of the foregoing disclosure and discussion without departing from the spirit or scope of the disclosure or from the scope of the claims.

I claim:
1. An animal toy comprising a hemisphere disposed as a self-righting base member; a mast attached to and extending upwardly from said hemisphere, and self-rightable with said hemisphere; a cord suspended from an upper portion of said mast; and a lure attractive to a household pet, attached to a lower end portion of said cord at a point in close proximity to said base.

2. In the toy device of claim 1, a slot in a top-most section of said mast, said cord being suspended from said slot, and said lure simulating a mouse and comprising catnip.

3. In the device of claim 1, said mast having a length not exceeding about three times the diameter of said base.

4. An animal toy comprising a self-righting base member having a convex bottom, a mast attached to and extending upwardly from said base member and self-rightable with said base member, a cord suspended from an upper portion of said mast, and a lure attractive to a household pet attached to a lower end portion of said cord at a point in close proximity to said base member.

References Cited in the file of this patent

UNITED STATES PATENTS

| | | |
|---|---|---|
| 712,786 | Flint | Nov. 4, 1902 |
| 2,096,078 | Windsor | Oct. 19, 1937 |
| 2,307,905 | Ament | Jan. 12, 1943 |